United States Patent
Meixner

(10) Patent No.: US 8,141,449 B2
(45) Date of Patent: Mar. 27, 2012

(54) DRIVE UNIT AND METHOD FOR ACCESSING A DRIVE UNIT

(75) Inventor: Christian Meixner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 1060 days.

(21) Appl. No.: 12/003,205

(22) Filed: Dec. 20, 2007

(65) Prior Publication Data

US 2008/0276740 A1    Nov. 13, 2008

(30) Foreign Application Priority Data

Dec. 20, 2006   (DE) .................. 10 2006 060 294

(51) Int. Cl.
*F16H 57/00*    (2012.01)
*B23P 11/00*    (2006.01)

(52) U.S. Cl. ........................................ 74/434; 29/893.1
(58) Field of Classification Search ............... 74/434, 74/446–451

See application file for complete search history.

(56) References Cited

U.S. PATENT DOCUMENTS

| 4,766,777 | A  | * | 8/1988  | Hartz et al. ............... 74/606 R |
| 6,204,577 | B1 | * | 3/2001  | Chottiner et al. ............. 310/424 |
| 6,253,437 | B1 | * | 7/2001  | Levin .............................. 29/271 |
| 7,201,267 | B2 | * | 4/2007  | Swanson et al. ........... 192/85.23 |
| 7,311,189 | B2 | * | 12/2007 | Swanson et al. ........... 192/85.23 |

FOREIGN PATENT DOCUMENTS

| DE | 196 10 872       | 6/1997 |
| DE | 19610872 C1      | 6/1997 |
| DE | 10 2004 054 111  | 6/2005 |
| DE | 10 2005 045 946  | 6/2006 |
| EP | 1 347 210        | 9/2003 |
| EP | 1 526 025        | 4/2005 |
| EP | 1653123 A2       | 5/2006 |

* cited by examiner

*Primary Examiner* — Raymond W Addie
(74) *Attorney, Agent, or Firm* — Novak Druce + Quigg LLP

(57) ABSTRACT

The invention relates to a drive unit comprising an internal combustion engine and a gearbox for motor vehicles, wherein for transmitting a torque to the transmission a crankshaft of the internal combustion engine is connected to a transmission-side element via a carrier plate. According to the invention, the carrier plate is designed in at least two parts with separate plate sections.

11 Claims, 1 Drawing Sheet

DRIVE UNIT AND METHOD FOR ACCESSING A DRIVE UNIT

CROSS-REFERENCE TO RELATED APPLICATION

Figure 1:
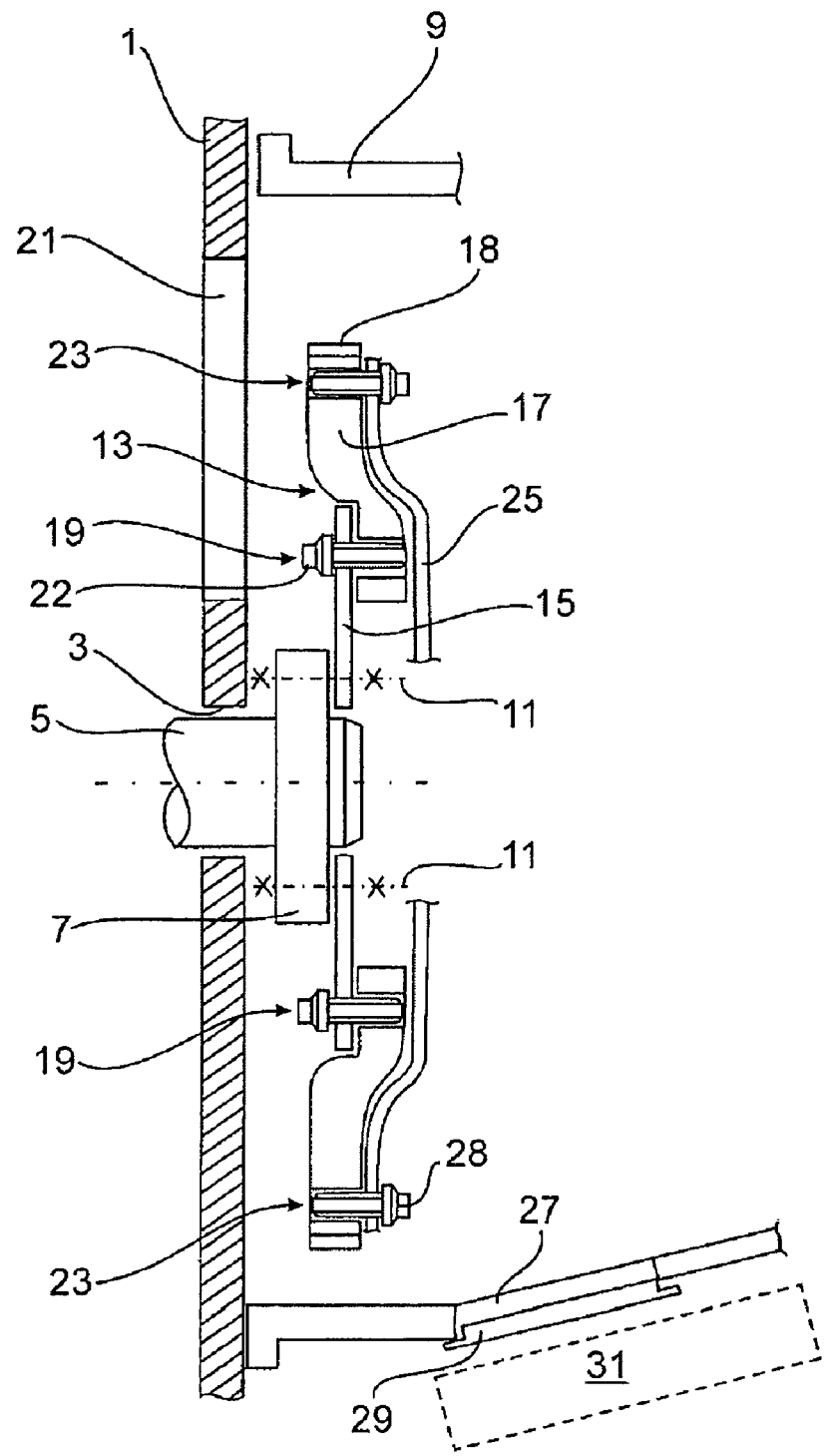

This application claims priority from German Application No. 102006060294.3 filed Dec. 20, 2006, hereby incorporated by reference in its entirety.

The invention relates to a drive unit, and a method for installing a drive unit.

BACKGROUND OF THE INVENTION

In automotive production, the reciprocating internal combustion engine and the gearbox of a motor vehicle drive unit are usually joined together in the automotive manufacturing plant.

A generic drive unit for a motor vehicle is known from EP 1 653 123 A2, in which a carrier plate attached to a crankshaft of the internal combustion engine is connected to a transmission-side element in order to transmit a torque to an input shaft of the gearbox.

Specifically, on the radially outward side the carrier plate is screwed via a screw connection to an adapter flange, which on the radially inward side is screwed to a dual-mass flywheel of a starter element of the transmission. To install the drive unit, first the housing of the gearbox is flanged to a rear wall of the internal combustion engine. The carrier plate on the internal combustion engine side and the adapter flange on the transmission side are then screwed together through their complementary boreholes. For this purpose a clutch bell housing has an assembly opening for tool access.

Depending on the type of vehicle, however, this assembly opening in the transmission housing may be covered, for example by an oil-water heat exchanger mounted on the transmission, thus preventing accessibility by the installation tool for quick assembly in the automotive manufacturing plant.

A further drive unit is known from EP 1 347 210 B1 in which the output-side end of the crankshaft is connected in a rotationally fixed manner to a torque converter via a torque-transmitting carrier plate. The screw connection between the carrier plate and the torque converter is oriented at an angle to the central axis, and is accessible through an assembly opening of an intermediate housing.

An engine block for an internal combustion engine is known from DE 196 10 872 C1, having a receiving opening for accommodating the starter. At the same time, the receiving opening forms part of an assembly opening for mounting a torque converter on the carrier plate.

A further drive unit is known from DE 10 2004 054 111 AI. At the engine side of the transmission unit a space is provided for introducing a tool for connecting the carrier plate to a torque converter.

The object of the present invention is to provide a drive unit for vehicles, or a method for installing a drive unit, which can be installed easily and in a time-saving manner.

SUMMARY OF THE INVENTION

According to one as part of the invention, the carrier plate is designed in at least two parts with separate plate sections. These plate sections may be connected to one another in a rotationally fixed manner via a first connection point. The location of the connection point of the two plate sections of the carrier plate is selected so that it is easily and quickly accessible for installation.

To further simplify and speed up the installation or uninstallation, at least two assembly openings which are offset relative to one another may be provided in the drive unit for tool access. By use of the two assembly openings, quick and easy tool access for installation or uninstallation of the carrier plate can always be ensured for different mounting situations.

The connection point may be designed as a detachable connection, such as a screw connection, or as a nondetachable connection, such as a riveted or welded connection.

The carrier plate with its first plate section may preferably be screwed to a transmission-side element via at least one radially outward screw connection as a second connection point. The radially outward screw connection between the carrier plate and the transmission-side element may be detached, for example for maintenance, by means of a suitable tool. The radially outward screw connection is preferably offset relative to the first connection point between the two plate sections of the carrier plate. Depending on the mounting situation or accessibility, for maintenance either the first connection point between the plate sections or the radially outward second connection point of the carrier plate to the starter element may be detached.

DETAILED DESCRIPTION OF EMBODIMENTS OF THE INVENTION

The transmission-side element may, for example, be an adapter flange which connects the carrier plate in a rotationally fixed manner to a starter element, for example a torque converter, friction clutch, and/or dual-mass flywheel. Alternatively, the transmission-side element itself may be the starter element.

It is preferred that each of the two assembly openings is respectively associated with the first or second connection point for the carrier plate. Depending on the tool accessibility, the carrier plate may be installed through a first assembly opening. For maintenance, the carrier plate may be uninstalled through a second assembly opening.

For example, the radially outward connection point between the carrier plate and the transmission-side element may be associated with a transmission housing-side assembly opening. The transmission housing-side assembly opening ensures easy access to the radially outward screw connection.

Similarly, for allowing easy access to the connection point an engine block-side assembly opening may be associated with the connection point between the two plate sections of the carrier plate. The transmission housing-side assembly opening and the engine block-side assembly opening may be offset relative to one another. Even for different mounting situations this ensures that at least one of the assembly openings is [accessible] for uninstalling the crankshaft from the transmission input shaft for maintenance.

To allow an offset configuration of the two assembly openings, it may be advantageous for the connection point between the two plate sections of the carrier plate to be radially inwardly offset relative to the screw connection between the carrier plate and the starter element.

From a manufacturing standpoint it is preferred that the engine block-side assembly opening has a double function and at the same time acts as a receiving opening for a starter.

Due to the two-part design of the carrier plate, the two plate sections may be correspondingly optimized. Thus, one of the two plate sections may bear a starter ring gear at the outer periphery, thus having a correspondingly thick-walled design compared to the other plate section.

For the factory installation of the drive unit, the assembly opening for the external screw connection may be covered by an oil-water heat exchanger or other components and therefore may be inaccessible. In this case, according to the invention in an intermediate installation step the still-open receiving opening in the engine block or the starter may function as an access opening for a tool. By use of the tool the two plate sections of the carrier plate may be screwed together, thus connecting the gearbox to the internal combustion engine.

On the other hand, according to the invention, by means of the transmission-side assembly opening a second tool access point may be provided for the outer connection point for screwing the carrier plate to the transmission-side element. For maintenance, the transmission-side assembly opening allows tool access for the external screw connection of the carrier plate after the oil-water heat exchanger mounted to the transmission has been removed.

When the internal combustion engine and gearbox are still separate, in a preinstallation step it may be advantageous to screw the first plate section of the carrier plate to the transmission-side starter element. Analogously, the second plate section of the carrier plate is screwed to the crankshaft of the internal combustion engine. The two plate sections of the carrier plate are then joined together when the drive unit is assembled. The two plate sections of the carrier plate may be screwed through the still-open starter hole in the engine block by use of a suitable tool.

For maintenance purposes it may be necessary to uninstall the transmission-side element from the crankshaft of the internal combustion engine. In this case tool access through the starter hole in the engine block is no longer possible, since at that point an electric starter motor for starting the internal combustion engine has been inserted into the starter hole.

In such a maintenance situation the transmission housing-side assembly opening must be exposed by uninstalling the oil-water heat exchanger mounted on the transmission. This allows tool access for the external screw connection between the carrier plate and the starter element.

Thus, according to the invention, the internal combustion engine may be joined to the gearbox via the still-open starter hole. In contrast, for maintenance the transmission is uninstalled from the internal combustion engine via the transmission housing-side assembly opening. One exemplary embodiment of the invention is described below with reference to the accompanying FIGURE, which shows in a rough schematic fashion a section of an assembled drive unit for a motor vehicle, which in a known manner has an internal combustion engine and a gearbox.

Of the internal combustion engine, the FIGURE shows only a rear housing flange of an engine block 1 for the internal combustion engine. A crankshaft 5 of the internal combustion engine, having a crankshaft flange 7 at its end, is guided through a bearing opening 3 in the engine block 1.

As further shown in the FIGURE in only an implied manner, a transmission housing 9 for the gearbox is flanged to the rear housing flange of the engine block 1. A transmission input shaft, not illustrated, may be guided in the transmission housing 9 in a coaxial manner with respect to the crankshaft 5.

For connecting the crankshaft 5 to the gearbox, a two-part carrier plate 13 is fastened to the crankshaft flange 7 via indicated screw connections 11. According to the FIGURE, the carrier plate 13 has a radially inward plate section 15 and a radially outward plate section 17. According to the FIGURE, the radially inward plate section 15 of the carrier plate 13 has a flat, thin-walled design. The outer periphery of the inner plate 15 centers the outer section 17, which for stability reasons has a thick-walled design and on the side of its outer periphery bears a starter ring gear 18.

The inner section 15 and the outer section 17 of the carrier plate 13 partially overlap, and by means of their mutually aligned corresponding screw holes are screwed by screws 19, which represent a first connection point. The plate sections 15 and 17 are screwed together in an intermediate installation step before the starter motor is inserted into the starter hole 21. The still-open starter hole 21 is used as a tool access point for the screw head 22 of the screw 19.

On the radially outward side, below the starter ring gear 18, the outer section 17 is screwed to a transmission-side adapter flange 25 via a radially outward screw connection 23 as a second connection point. Correspondingly, according to the FIGURE a torque may be transmitted from the crankshaft 5, via the carrier plate 13 and the adapter flange 25, to a transmission-side starter element.

As further shown in the FIGURE, in the mounting position shown the transmission housing 9 has an assembly opening 27 which is closed by a cover 29. Below the cover 29, roughly indicated by dashed lines, is a transmission-mounted oil-water heat exchanger 31 which completely covers the assembly opening 27. The assembly opening 27 does not represent provide quick and easy tool access, suitable for mass production, to the radially outward screw connection. Rather, the assembly opening 27 provides tool access for loosening the outer screw connection 23 for maintenance, as described below. For this purpose, the shown screw head 28 for the screw connection 23 faces the assembly opening 27.

A method for installing the drive unit shown in the FIGURE is described below. To this end, when the internal combustion engine and gearbox are still separate, in the automotive manufacturing plant the outer section 17 of the two-part carrier plate 13 may first be screwed to the transmission-side adapter flange 25 via the screwed connection point 23. On the other hand, the inner section 15 of the carrier plate 13 is screwed to the crankshaft flange 7.

In the automotive manufacturing plant the transmission housing 9 may then be axially flanged to the housing flange for the engine block 1, so that the inner section 15 is overlapped by the outer section 17 of the carrier plate 13. In the transmission assembly plant the transmission-mounted oil-water heat exchanger 31 indicated in the FIGURE has already been installed, below the transmission housing 9.

In a subsequent installation step the screws 19 may be inserted, through the still-open starter hole 21 in the housing flange 1, into corresponding boreholes in the inner section 15 and outer section 17 of the carrier plate 13, and the two sections are screwed together. An electric starter motor, not shown, is then inserted into the starter hole 21, and the starter motor is brought into meshing contact with the starter ring gear 18.

In contrast to the installation in the automotive manufacturing plant, for maintenance, i.e., in the case of a required transmission replacement, for example, the connection point 19 between the two section 15 and 17 of the carrier plate 13 is inaccessible to the technician on account of the starter motor mounted in the starter hole 21.

For this reason the transmission-mounted oil-water heat exchanger 31 is uninstalled to expose the cover 29 of the assembly opening 27 for the transmission housing 9. The cover 29 may then be removed, and the radially outward screw connection 23 loosened using a suitable tool, in order to detach the transmission-side adapter flange 25 from the outer section 17.

The invention claimed is:

1. A unit for transmitting torque from an internal combustion engine to a gearbox of a motor vehicle, wherein said engine includes a housing having a wall provided with a first opening though which an output shaft of said engine extends, and a second opening radially spaced from said first opening, and said gearbox includes a housing having at least one wall connectable to said engine housing wall, comprising:

a first annular member having an inner annular portion connectable concentrically to said engine output shaft, and a radially spaced annular portion;

a second annular member having an inner annular portion connectable concentrically to an input shaft of said gearbox, and a radially spaced annular portion; and means for connecting said radially spaced annular portion of said first annular member to said radially spaced annular portion of said second annular member, accessible through said second opening of said engine housing wall.

2. The unit according to claim 1 wherein said first and second annular members are connectable with threaded fasteners.

3. The unit according to claim 1 wherein said radially spaced annular portion of said second annular member is accessible through a closable opening in said gearbox housing wall.

4. The unit according to claim 3 wherein said first and second annular members are connectable with threaded fasteners.

5. The unit according to claim 1 including a ring gear interposed between said first and second annular members, provided with a gear tooth set operatively connectable to a drive gear of a starter motor mounted on a shaft extending through said first opening in said engine housing wall.

6. The unit according to claim 5 wherein said outer portion of said first annular member is connectable to a radially inner portion of said ring gear, accessible through said second opening of said engine housing wall.

7. The unit according to claim 5 wherein said outer portion of said second annular member is connectable to a radially outer portion of said ring gear.

8. A unit according to claim 5 wherein a connection of said second annular member and said ring gear is accessible through a closable opening in said gearbox housing wall.

9. A unit according to claim 5 wherein said radially inner and outer portions of said ring gear are disposed in axially displaced planes.

10. A method of attending to a connection between a first annular member and an intermediate member disposed between said first annular member and a second annular member, in a drive unit of an internal combustion engine of a motor vehicle, wherein said first annular member is connected to an output shaft of said engine, extending through a first opening in a housing wall of said engine, provided with a radially spaced second opening, and said second annular member is connected to an input shaft of a gearbox disposed in a housing connected to said engine housing wall, comprising accessing said connection between said first annular members and said intermediate member through said second opening in said engine housing wall.

11. A method according to claim 10 including accessing a connection between said second annular member and said intermediate member through a closable opening in said gearbox housing wall.

* * * * *